(12) United States Patent
Takagi

(10) Patent No.: US 9,911,330 B2
(45) Date of Patent: Mar. 6, 2018

(54) DRIVING ASSISTANCE DEVICE AND DRIVING ASSISTANCE METHOD

(71) Applicant: Nissan Motor Co., Ltd., Yokohama-Shi, Kanagawa (JP)

(72) Inventor: Yoshitaka Takagi, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/504,516

(22) PCT Filed: Aug. 21, 2014

(86) PCT No.: PCT/JP2014/071902
§ 371 (c)(1),
(2) Date: Feb. 16, 2017

(87) PCT Pub. No.: WO2016/027351
PCT Pub. Date: Feb. 25, 2016

(65) Prior Publication Data
US 2017/0236413 A1 Aug. 17, 2017

(51) Int. Cl.
*B60W 40/04* (2006.01)
*B60W 40/09* (2012.01)
(Continued)

(52) U.S. Cl.
CPC ..... *G08G 1/0968* (2013.01); *B60W 30/18154* (2013.01); *B60W 40/04* (2013.01);
(Continued)

(58) Field of Classification Search
CPC ....... B60W 30/18154; B60W 2550/10; B60W 2550/22; B60W 2550/30; B60W 2550/308; G05D 1/0214; G05D 1/0212
See application file for complete search history.

(56) References Cited

U.S. PATENT DOCUMENTS 5,939,976 A 8/1999 Sasaki et al.
8,482,431 B2 * 7/2013 Kushi ................ G08G 1/161
340/425.5
(Continued)

FOREIGN PATENT DOCUMENTS

JP H09270097 A 10/1997
JP H1153690 A 2/1999
(Continued)

*Primary Examiner* — Todd Melton
(74) *Attorney, Agent, or Firm* — Young Basile Hanlon & MacFarlane, P.C.

(57) ABSTRACT

A driving assistance device detects an object in front of a vehicle by an object detector, detects right/left turn information indicating that the vehicle passes across an opposite lane to turn right or left at an intersection after a predetermined period of time based on a current position and a traveling route of the vehicle included in road information, determines whether a standby vehicle waiting to turn right or left in the opposite lane is present in the intersection according to a detection result of the object detector and the road information when the right/left turn information is detected, estimates a blind spot of the object detector in the opposite lane caused by the standby vehicle, and sets a standby area in which the vehicle waits to turn right or left based on the estimated blind spot.

18 Claims, 12 Drawing Sheets

(51) Int. Cl.
*B60W 30/18* (2012.01)
*G08G 1/0968* (2006.01)
*G08G 1/095* (2006.01)
*G05D 1/00* (2006.01)

(52) U.S. Cl.
CPC ............ *B60W 40/09* (2013.01); *G08G 1/095* (2013.01); *B60W 2550/10* (2013.01); *B60W 2550/22* (2013.01); *B60W 2550/30* (2013.01); *B60W 2550/308* (2013.01); *G05D 1/0088* (2013.01)

(56) References Cited

U.S. PATENT DOCUMENTS

| | | | |
|---|---|---|---|
| 8,712,624 B1* | 4/2014 | Ferguson | B60W 30/18154 701/117 |
| 9,302,678 B2* | 4/2016 | Murphy | B60W 50/14 |
| 2011/0095907 A1 | 4/2011 | Kushi et al. | |
| 2011/0095909 A1 | 4/2011 | Kushi et al. | |
| 2012/0206483 A1* | 8/2012 | Funabashi | G08G 1/096716 345/629 |
| 2013/0289824 A1* | 10/2013 | Mudalige | G08G 1/167 701/41 |

FOREIGN PATENT DOCUMENTS

| | | |
|---|---|---|
| JP | 2006227811 A | 8/2006 |
| JP | 2008041058 A | 2/2008 |
| JP | 2010079565 A | 4/2010 |
| JP | 2011090582 A | 5/2011 |

\* cited by examiner

DRIVING ASSISTANCE DEVICE AND DRIVING ASSISTANCE METHOD

TECHNICAL FIELD

The present invention relates to a driving assistance device and a driving assistance method for assisting a vehicle in driving.

BACKGROUND

When a vehicle having a sensor for detecting an object on the front side passes across the opposite lane to turn right or left at an intersection, a blind spot of the sensor may be caused in the opposite lane while the vehicle is waiting for the right or left turn because of an oncoming vehicle waiting to turn right or left in the opposite lane. A driving support apparatus for dealing with this problem is disclosed that notifies a driver of a risk of turning right or left due to an oncoming vehicle waiting to turn right or left in the opposite lane, depending on the degree of a blind spot of a sensor (refer to Japanese Unexamined Patent Application Publication No. 2011-090582).

The method of assisting the vehicle in turning right or left as disclosed in Japanese Unexamined Patent Application Publication No. 2011-090582, however, merely notifies the driver of the risk of the right or left turn, and fails to suggest a stop position upon the right or left turn in view of the blind spot due to the oncoming vehicle waiting to turn right or left in the opposite lane.

SUMMARY

In view of the foregoing, an object of the present invention is to provide a driving assistance device and a driving assistance method capable of directing a vehicle to wait to turn right or left at a position in view of a risk and efficiency of the right or left turn.

A driving assistance device according to a first aspect of the present invention detects an object in front of a vehicle by an object detector, detects right/left turn information indicating that the vehicle passes across an opposite lane to turn right or left at an intersection after a predetermined period of time based on a current position and a traveling route of the vehicle included in road information, determines whether a standby vehicle waiting to turn right or left in the opposite lane is present in the intersection according to a detection result of the object detector and the road information when the right/left turn information is detected, estimates a blind spot of the object detector in the opposite lane caused by the standby vehicle, and sets a standby area in which the vehicle waits to turn right or left based on the estimated blind spot.

DETAILED DESCRIPTION OF THE DRAWINGS

DETAILED DESCRIPTION OF THE EMBODIMENTS

Figure 1:
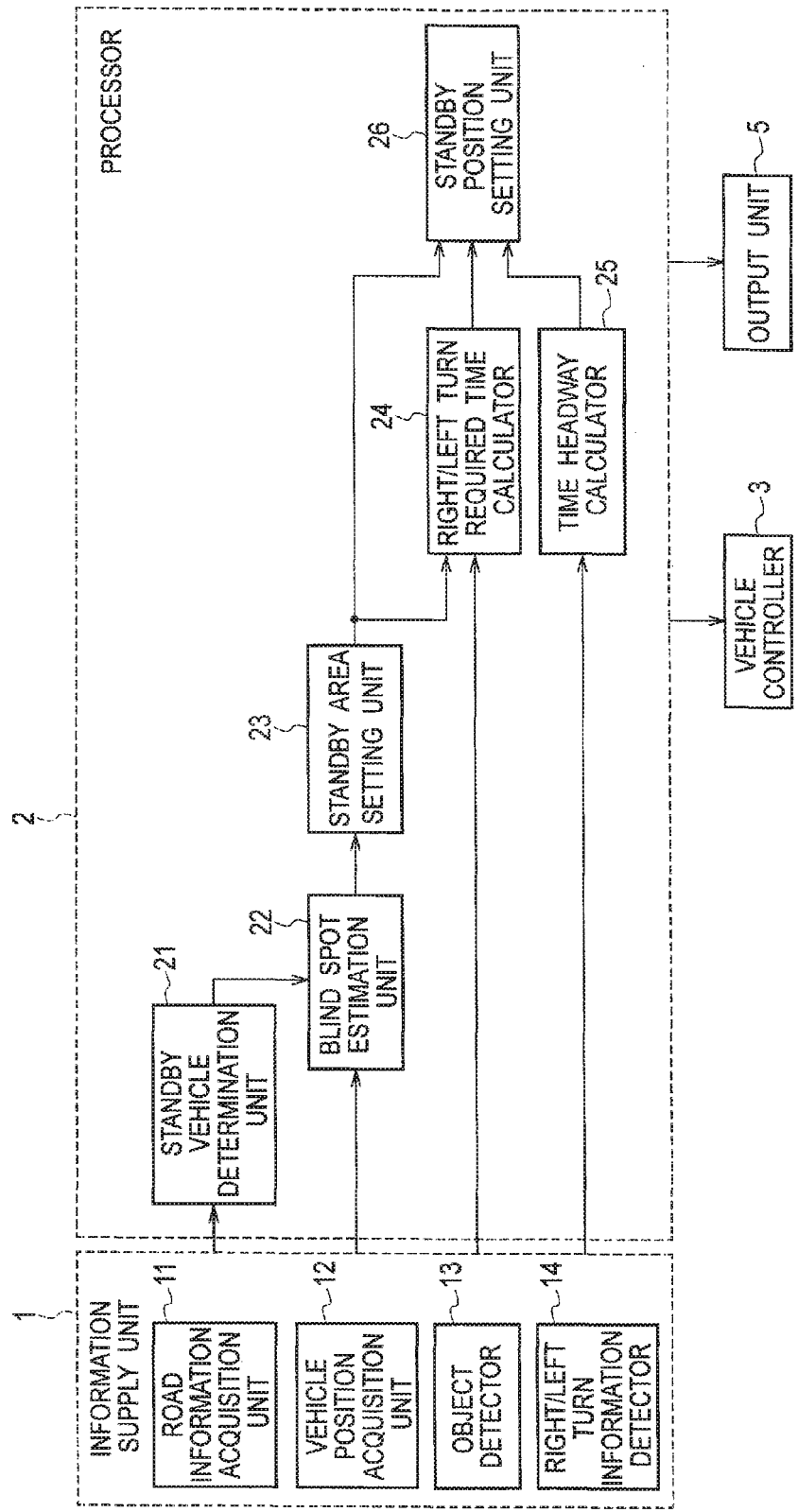
FIG. 1 is a block diagram for describing a fundamental configuration of a driving assistance device according to a first embodiment of the present invention.

Hereinafter, first and second embodiments of the present invention will be described with reference to the drawings. The same or similar elements in the drawings are designated by the same or similar reference numerals, and overlapping explanations are omitted herein.

[First Embodiment]

Figure 2:
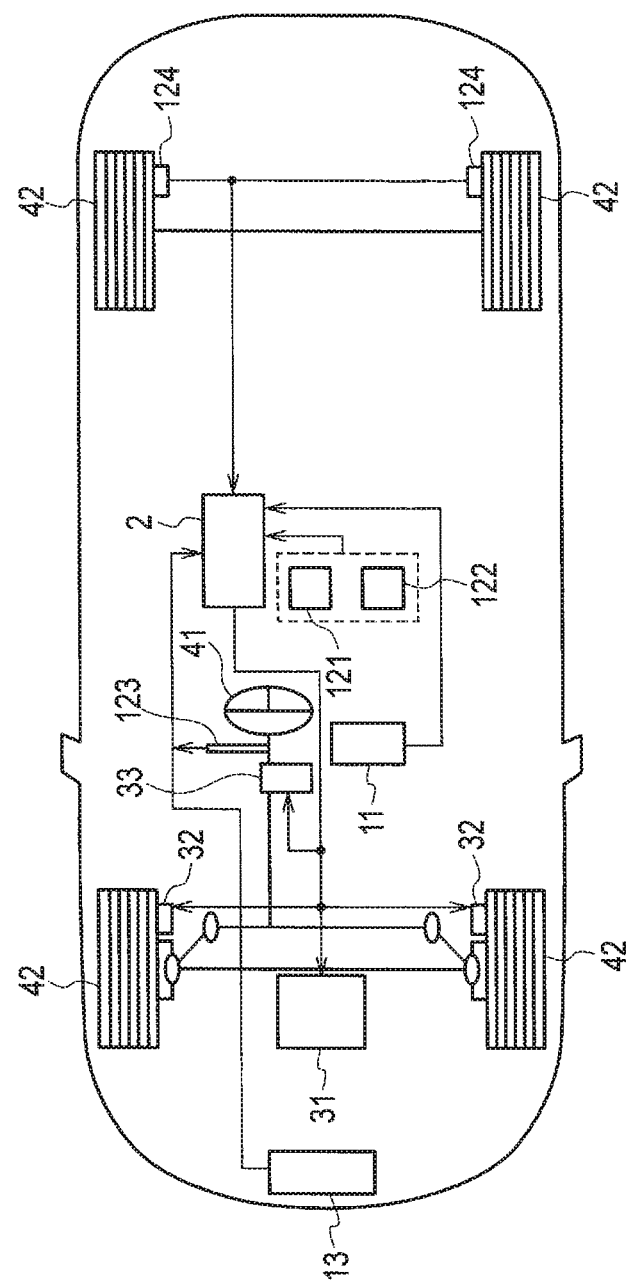
FIG. 2 is a schematic block diagram for describing a fundamental configuration of a vehicle equipped with the driving assistance device according to the first embodiment of the present invention.

As shown in FIG. 1, a driving assistance device according to the first embodiment of the present invention includes an information supply unit 1, a processor 2 to which various kinds of information are supplied from the information supply unit 1, so as to execute processing necessary for operations of the driving assistance device, a vehicle controller 3, and an output unit 5. As shown in FIG. 2, the driving assistance device according to the first embodiment is installed in a vehicle C and assists the vehicle C in driving when turning right or left. The vehicle C may be either an autonomous vehicle which autonomously drives on a set traveling route, or a vehicle driven by the operation of a driver.

The information supply unit 1 includes a road information acquisition unit 11, a vehicle position acquisition unit 12, an object detector 13, and a right/left turn information acquisition unit 14. The road information acquisition unit 11 acquires road information so that the vehicle C can follow a road to drive, and outputs the information to the processor 2. The road information acquisition unit 11 is, for example, a car navigation device which stores a digital map as the road information. The road information includes a width of a road, a radius of curvature, a scale of an intersection, the number of lanes, a type of a road, and a legal speed limit.

The vehicle position acquisition unit 12 acquirers a current position of the vehicle C according to the road information acquired by the road information acquisition unit 11. The vehicle position acquisition unit 12 includes a positioning device 121 such as a global positioning system (GPS), a gyro sensor 122, a steering angle sensor 123, and a speed sensor 124. The vehicle position acquisition unit 12 supplements the information of the position acquired by the positioning device 121 according to detection results of outside recognition sensors such as the gyro sensor 122, the steering angle sensor 123, the speed sensor 124, and a camera, so as to recognize the supplemented position as a current position of the vehicle C.

The object detector 13 detects objects in front of the vehicle C. The object detector 13 is, for example, an outside recognition sensor such as a laser range finder implementing angular resolution and range resolution. The object detector 13 may include one or more detectors for detecting objects not only in front of the vehicle C but also surrounding the vehicle C, or may include an outside recognition sensor such as a camera.

The right/left turn information acquisition unit 14 detects right/left turn information indicating that the vehicle C passes across the opposite lane to turn right or left at an intersection after a predetermined period of time, based on the current position and a traveling route of the vehicle C included in the road information acquired by the road information acquisition unit 11. The right/left turn information detector 14 may be the same car navigation device as the road information acquisition unit 11. In the car navigation device, the traveling route is preliminarily set onto the digital map as the road information by a user. The right/left turn information acquisition unit 14 may detect the right/left turn information according to a turn signal operated by the driver.

The processor 2 includes a standby vehicle determination unit 21, a blind spot estimation unit 22, a standby area setting unit 23, a right/left turn required time calculator 24, a time headway calculator 25, and a standby position setting unit 26. The respective elements composing the processor 2 are indicated as logical structures, and may be implemented in hardware either integrally or independently.

When the right/left information detector 14 detects the right/left turn information, the standby vehicle determination unit 21 determines whether a standby vehicle waiting for a right or left turn in the opposite lane is present in the intersection included in the right/left turn information. The standby vehicle determination unit 21 determines whether a standby vehicle is present according to the detection result of the object detector 13 and the road information acquired by the road information acquisition unit 11. The standby vehicle determination unit 21 recognizes the standby vehicle, based on the current position of the vehicle C, such that the detection result of the object detector 13 is laid out on the digital map of the road information acquisition unit 11.

The blind spot estimation unit 22 estimates a blind spot of the object detector 13 which may occur due to the standby vehicle and the like in the opposite lane detected by the standby vehicle determination unit 21. The standby area setting unit 23 sets a standby area necessary for detecting the opposite lane by the object detector 13 while waiting for a right or left turn so that the vehicle C can turn right or left safely, based on the blind spot estimated by the blind spot estimation unit 22.

The right/left turn required time calculator 24 calculates each required time Tb during which the vehicle C starts and finishes turning right or left at each position within a standby allowable area in which the vehicle C can wait to turn right or left, based on the road information acquired by the road information acquisition unit 11. The standby allowable area is, for example, an area defined between a position at which the vehicle C can stop in front of a stop line at the intersection and substantially the middle of the intersection. The right/left turn required time calculator 24 calculates the required time Tb depending on the scale of the intersection included in the right/left turn information detected by the right/left turn information detector 14, and a turning curvature of the vehicle C. The required time Tb is a period of time during which the vehicle C starts turning right or left and reaches a position not inhibiting objects (other vehicles) from moving in the intersection.

The time headway calculator 25 calculates time headway (THW) Ta between straight-running vehicles in the opposite lane by the time at which the vehicle C enters the intersection included in the right/left turn information detected by the right/left turn information detector 14. The time headway Ta corresponds to the volume of traffic in the opposite lane. The time headway calculator 25 calculates, as the time headway Ta, a period of time during which a straight-running vehicle in the opposite lane passes through a predetermined point in the intersection and the following vehicle passes through the same point, or an average value or a minimum value of times for which a straight-running vehicle travels a predetermined distance in the intersection. The time headway calculator 25 recognizes the position of straight-running vehicles in the opposite lane, based on the current position of the vehicle C, such that the detection result of the object detector 13 is laid out on the digital map of the road information acquisition unit 11.

The standby position setting unit 26 sets a standby position at which the vehicle C waits to turn right or left within the standby area set by the standby area setting unit 23, according to the required time Tb calculated by the right/left turn required time calculator 24 and the time headway Ta calculated by the time headway calculator 25. The standby position setting unit 26 sets the standby position, for example, such that the required time Tb approximates to the time headway Ta.

As shown in FIG. 2, the vehicle controller 3 includes a driving unit 31 that drives the vehicle C in the forward and rearward directions, a brake 32 that decelerates the vehicle C, and an electric power steering (EPS) motor 33 that changes traveling directions of the vehicle C. The driving unit 31 includes, for example, a motor for rotating the wheels 42 and an inverter for driving the motor. The EPS motor 33 operates according to a turn of a steering wheel 41, so as to change directions of the front wheels 42. The configuration of the vehicle controller 3 illustrated is merely an example, and may be any configuration including the driving unit 31 serving as an internal combustion engine and the EPS motor 33 serving as a hydraulic system, for example.

The output unit 5 notifies the user of various kinds of information depending on the control of the processor 2. The output unit 5 is, for example, a display device for displaying light, images, and characters, or an output device such as a speaker for outputting sound.

<Driving Assistance Method>

Figure 3:
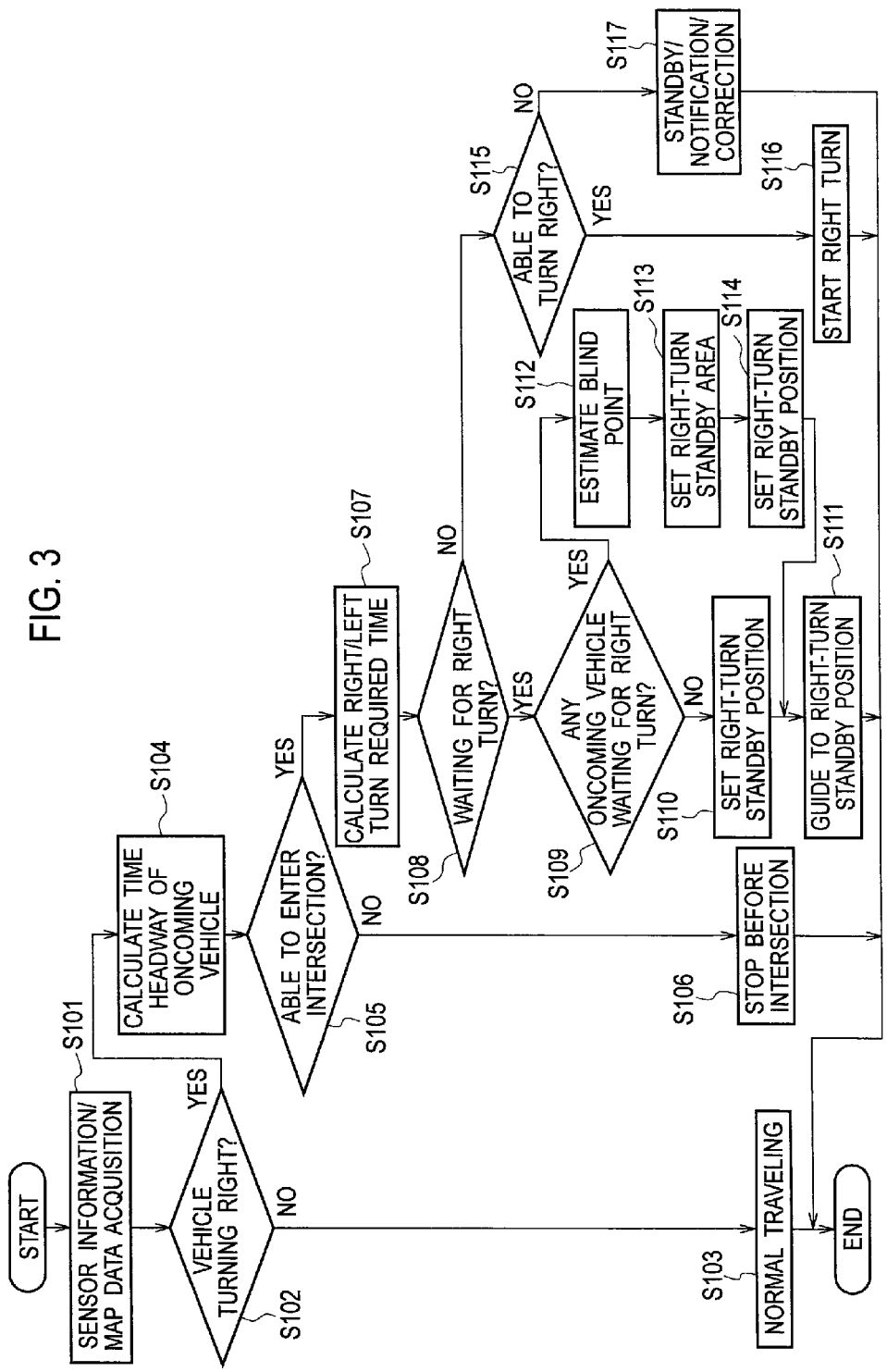
FIG. 3 is a flowchart for describing the operation of the driving assistance device according to the first embodiment of the present invention.

An example of a driving assistance method by the driving assistance device according to the first embodiment is described below with reference to the flowchart shown in FIG. 3. The example described below is the case in which the vehicle C equipped with the driving assistance device according to the first embodiment creates a traveling route to a destination set to the car navigation device by the user, and the vehicle C passes across an intersection to turn right on the traveling route. Although the following is the case in which the vehicle C follows the traffic regulations for left-hand traffic, the method may also be applicable to the example in which a vehicle passes across an intersection to turn left in the case of following the traffic regulations for right-hand traffic.

In step S101, the processor 2 acquires, at predetermined sampling periods, a current position of the vehicle C included in the road information from the vehicle position acquisition unit 12, and a detection result of the object detector 13.

In step S102, it is determined whether the right/left turn information detector 14 detects the right/left turn information indicating that the vehicle C passes across the opposite lane to turn right at the intersection after a predetermined period of time. The process proceeds to step S103 when the right/left turn information is not detected, and the process proceeds to step S104 when the right/left turn information is detected. In step S103, the vehicle C keeps normal traveling, and the process returns to step S101.

In step S104, the time headway calculator 25 calculates the time headway Ta between the straight-running vehicles in the opposite lane according to the road information, the current position of the vehicle C, and the detection result of the object detector 13. For example, vehicle D2 and vehicle D3 shown in FIG. 4 correspond to the straight-running vehicles in the opposite lane opposed to the vehicle C. The time headway calculator 25 calculates, as the time headway Ta, a period of time during which the vehicle D2 passes through a predetermined point in the intersection and the vehicle D3 then passes through the same point.

In step S105, the processor 2 determines whether the vehicle C can enter the intersection. According to the object detector 13 serving as a signal detector, such as a camera, for detecting a traffic signal at the intersection and a signal indicated by the traffic signal, the processor 2 determines that the vehicle C can enter the intersection when the signal indicates that the vehicle C is allowed to enter, and when no obstacle is present in front of the vehicle C. The process proceeds to step S106 when the vehicle C is not allowed to enter the intersection, and the process proceeds to step S107 when the vehicle C is allowed to enter the intersection.

Figure 4:
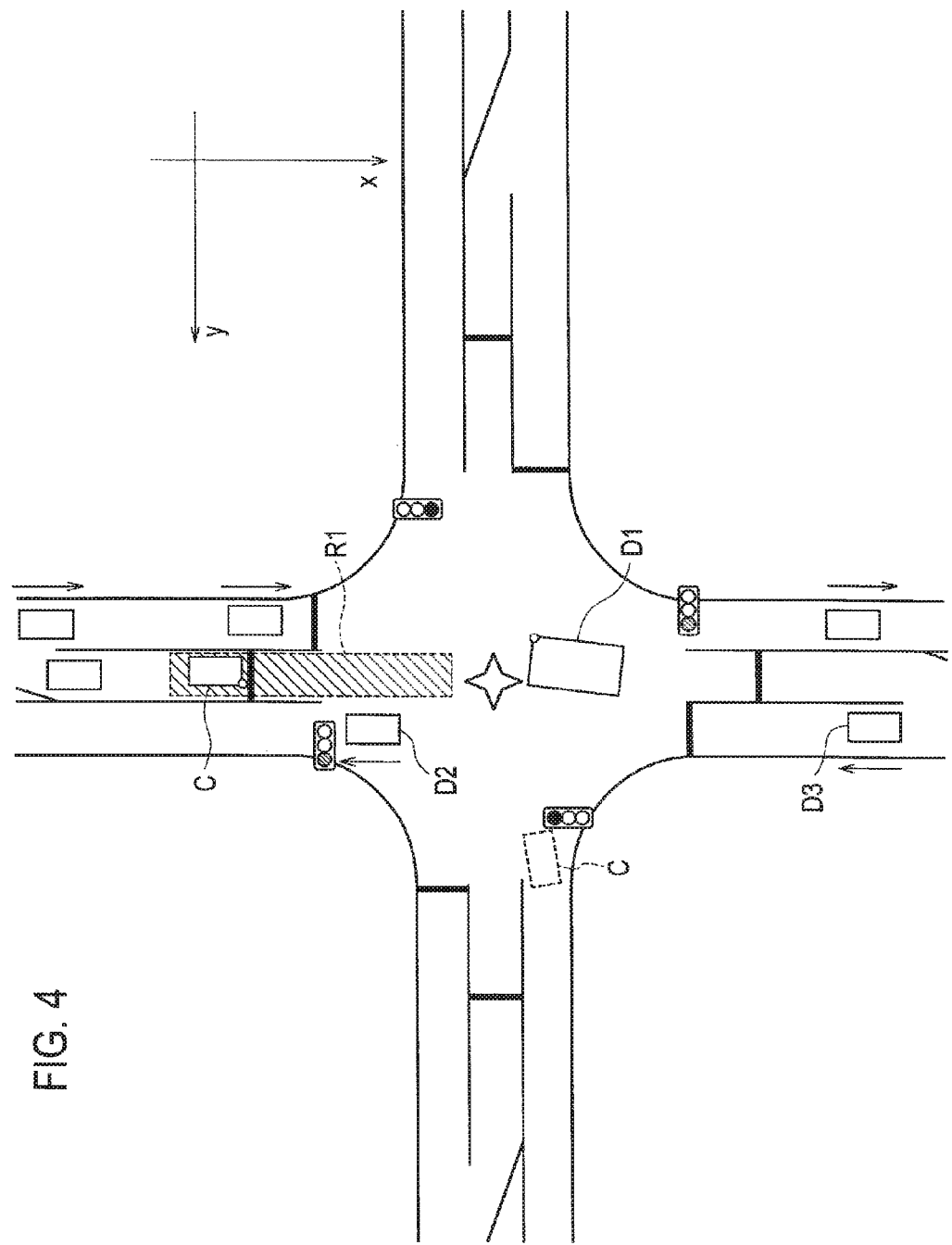
FIG. 4 is a view for describing the operation of the driving assistance device according to the first embodiment of the present invention.

In step S106, the processor 2 leads the vehicle C toward a stop line which is a boundary line at the intersection, as shown in FIG. 4, so that the vehicle C stops in front of the stop line, and the process proceeds to step S101. When the vehicle C is an autonomous vehicle, the processor 2 controls the vehicle controller 3 to operate the vehicle C to stop in front of the stop line. When the vehicle C is a vehicle driven by the operation of the driver, the processor 2 directs the driver to stop the vehicle C in front of the stop line by sound or an image through the output unit 5. The processor 2 may stop the traveling vehicle C in front of the stop line through the brake 32.

In step S107, the right/left turn required time calculator 24 calculates a required time $Tb_x$ from each position x as a provisional standby position at predetermined intervals in the traveling direction (x direction) of the vehicle C within a standby allowable area R1, as shown in FIG. 4. For example, when a position where the vehicle C stops at the stop line is set to x=0, and a position where the vehicle C reaches substantially the middle of the intersection is set to x=A, the predetermined time $Tb_x$ (x=0 to A) is each period of time during which the vehicle C starts turning right at each position x and reaches a position not inhibiting other vehicles from passing through the intersection. The vehicle C is assumed to stop at each position x within the standby allowable area R1 while keeping a forward posture in the traveling direction. The right-turn finish position at which the vehicle C does not inhibit other vehicles from passing through the intersection is a position of the vehicle C indicated by the broken line in FIG. 4, for example. When there are several lanes on the side after finishing turning right, the right-turn finish position to reach may be a leftmost lane, or may be changed as appropriate depending on traffic conditions.

In step S108, the processor 2 determines whether the vehicle C is waiting to turn right at a standby position set by the standby position setting unit 26. The process proceeds to step S109 when the vehicle C is in a standby state, and the process proceeds to step S115 when the vehicle C is not in a standby state.

In step S109, the standby vehicle determination unit 21 determines whether a standby vehicle waiting to turn right in the opposite lane is present in the intersection. For example, as shown in FIG. 4, vehicle D1 corresponds to the standby vehicle stopping in the intersection. The process proceeds to step S110 when there is no standby vehicle, and the process proceeds to step S112 when there is a standby vehicle.

Figure 5:
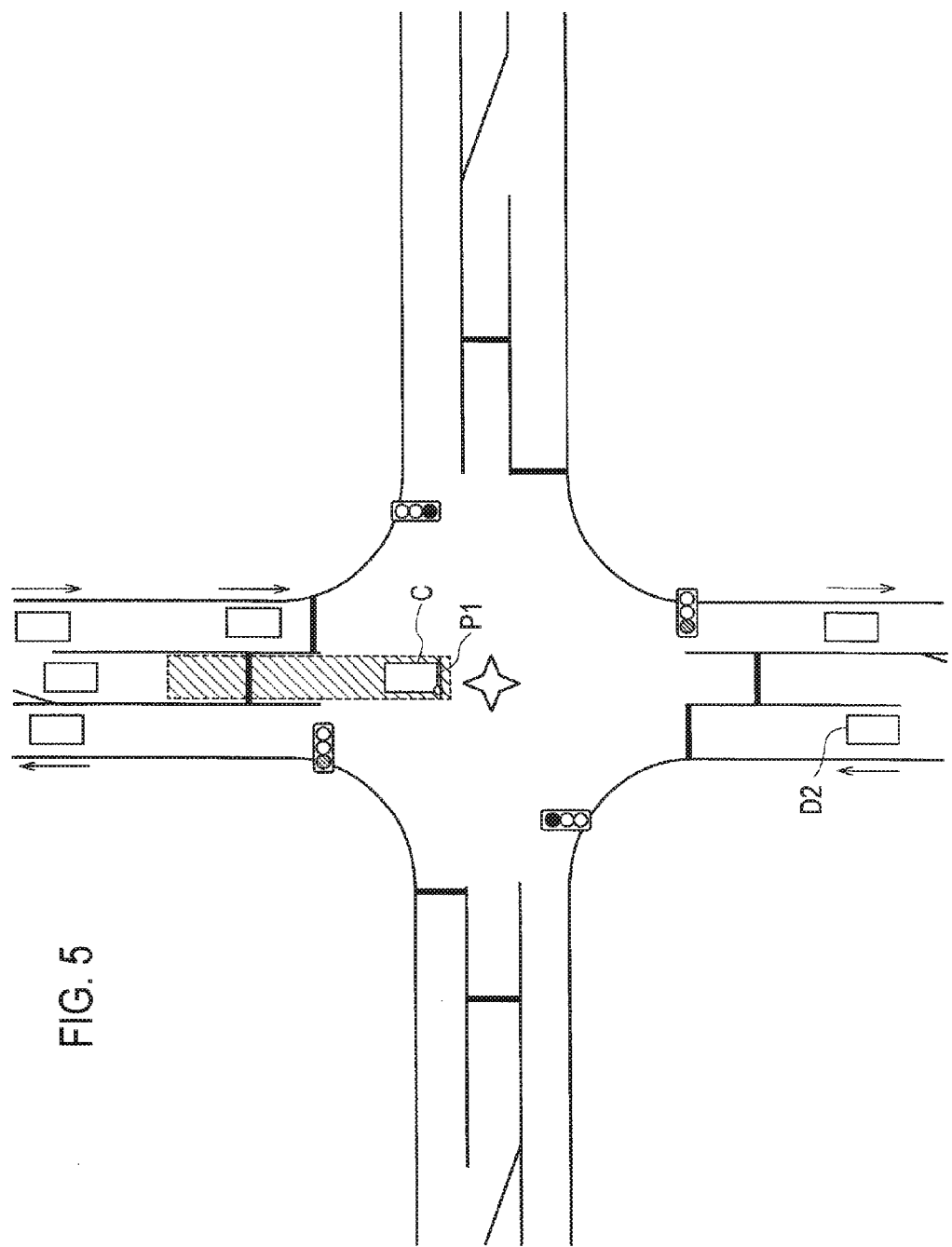
FIG. 5 is a view for describing the operation of the driving assistance device according to the first embodiment of the present invention.

In step S110, as shown in FIG. 5, the standby position setting unit 26 sets a standby position P1 at which the vehicle C waits to turn right, based on the time headway Ta and each required time $Tb_x$ calculated in step S104 and step S107, respectively. The standby position setting unit 26 sets, as the standby position P1, a provisional standby position at which the required time $Tb_x$ approximates to the time headway Ta within the standby allowable area R1.

In step S111, the standby position setting unit 26 leads the vehicle C to the standby position P1, and the process returns to step S101. When the vehicle C is an autonomous vehicle, the standby position setting unit 26 controls the vehicle controller 3 to operate the vehicle C to stop at the standby position P1. When the vehicle C is a vehicle driven by the operation of the driver, the standby position setting unit 26 directs the driver to stop the vehicle C at the standby position P1 through the output unit 5. The standby position setting unit 26 may stop the traveling vehicle C at the standby position P1 through the brake 32.

Figure 6:
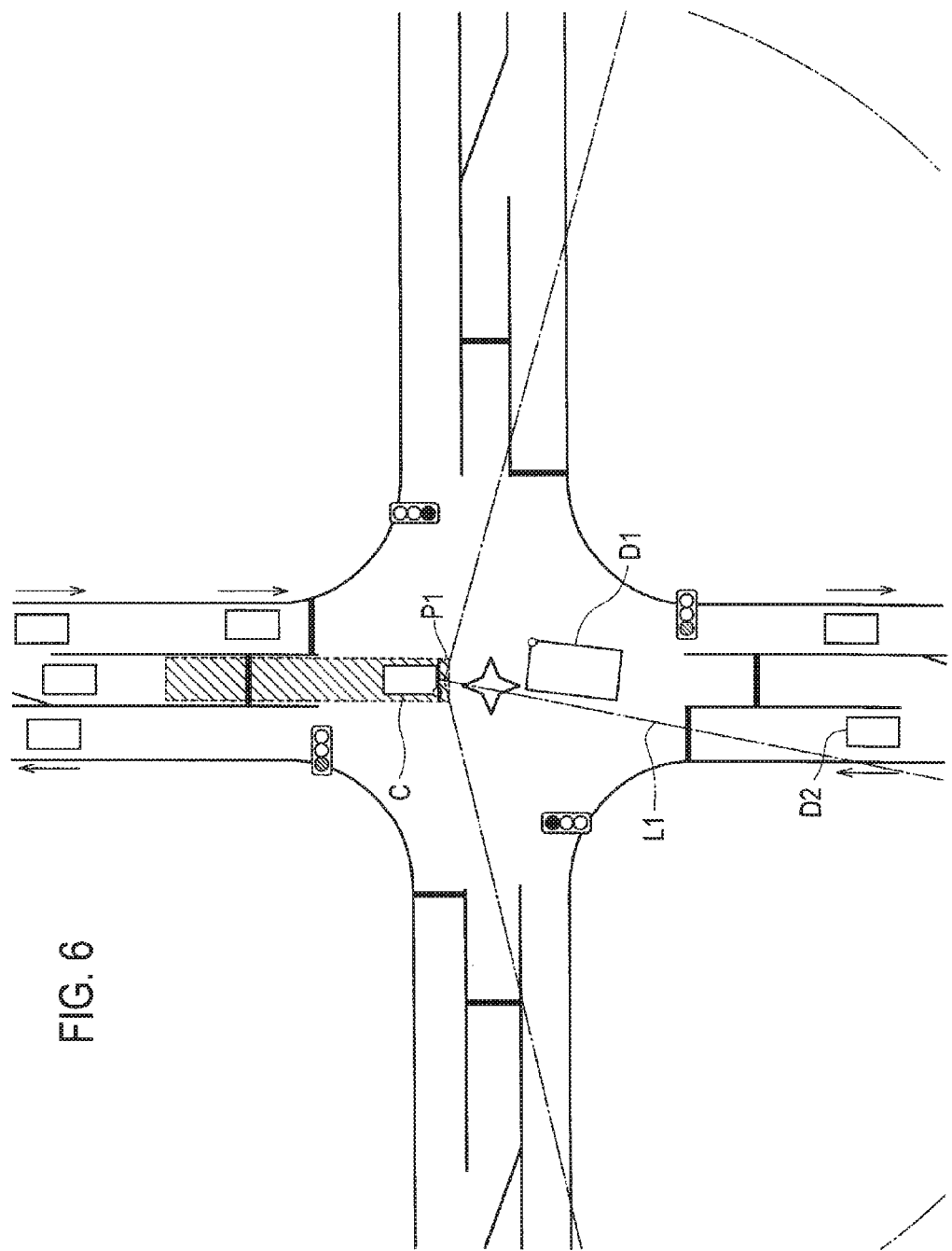
FIG. 6 is a view for describing the operation of the driving assistance device according to the first embodiment of the present invention.

In step S112, the blind spot estimation unit 22 estimates a blind spot of the object detector 13, at each position within the standby allowable area R1, due to the standby vehicle in the opposite lane detected by the standby vehicle determination unit 21. For example, as shown in FIG. 6, the blind spot estimation unit 22 estimates the blind spot of the object detector 13 due to the vehicle D1 which is the standby vehicle. The blind spot estimation unit 22 detects the position of the standby vehicle according to the road information, the current position of the vehicle C, and the detection result of the object detector 13, so as to lay out the positions of the vehicle C and the standby vehicle on the digital map. In the example shown in FIG. 6, the blind spot is caused in the opposite lane on the right side of the line L1 connecting the object detector 13 and the edge of the vehicle D1. The blind spot estimation unit 22 may estimate a blind spot according to an observable field of view, and angular resolution and range resolution of the object detector 13.

The blind spot estimation unit 22 estimates the blind spot at each position within the standby allowable area R1 in the x direction and the y direction (the right-left direction of the vehicle C) orthogonal to the x direction. For example, when the vehicle C is directed through the brake 32 or the output unit 5, the blind spot estimation unit 22 may estimate a blind spot at each position in the x direction while limiting to the position of the vehicle C in the y direction at the stop line. When the vehicle C is autonomously directed, the blind spot estimating unit 22 may estimate a blind spot at each position in the x direction while limiting to the position of the vehicle C in the y direction closer to the opposite lane in the traveling lane, so as to ensure better visibility. Even when the vehicle C is directed through the brake 32 or the output unit 5, the blind spot estimating unit 22 may estimate a blind spot at each position in the x direction while limiting to the position of the vehicle C in the y direction closer to the opposite lane in the traveling lane, so that the vehicle C is guided by the output unit 5 to the position in the traveling lane closer to the opposite lane. Each position in the x direction used for estimating the blind spot by the blind spot estimating unit 22 is each position used for calculating the required time $Tb_x$ in step S107.

For example, as shown in FIG. 6, when the vehicle D1 waiting to turn right is present in the opposite lane, the blind spot is smaller but the required time $Tb_x$ necessary for the right turn is longer as the position of the vehicle C waiting to turn right is distant from the intersection, whereas the required time $Tb_x$ is shorter but the blind spot is larger as the position of the vehicle C is closer to the middle of the intersection.

Figure 7:
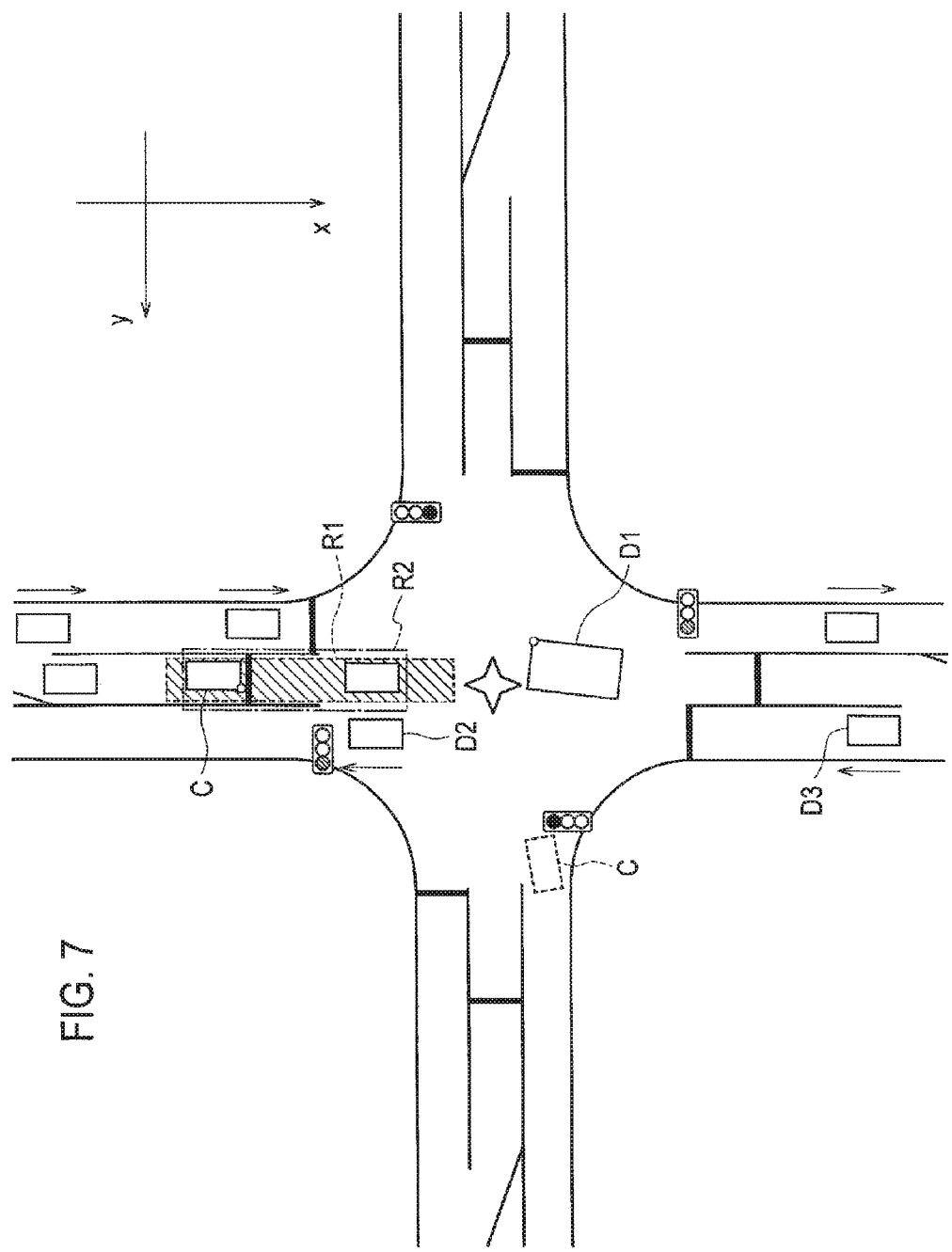
FIG. 7 is a view for describing the operation of the driving assistance device according to the first embodiment of the present invention.

In step S113, as shown in FIG. 7, the standby area setting unit 23 sets, within the standby allowable area R1, a standby area R2 in which the vehicle C can sufficiently look out over the distance to the opposite lane while the vehicle C is waiting to turn right, based on the blind spot estimated by the blind spot estimation unit 22. The standby area R2 is an area that the object detector 13 can detect the distance to the opposite lane to be observed, for example. The standby area setting unit 23 determines the distance to the opposite lane to be observed according to the legal speed limit in the opposite lane included in the road information.

In step S114, the standby position setting unit 26 sets the standby position P1 at which the vehicle C waits to turn right, based on the time headway Ta and each required time $Tb_x$ calculated in step S104 and step S107, respectively. The standby position setting unit 26 sets, as the standby position P1, a provisional standby position at which the required time $Tb_x$ approximates to the time headway Ta within the standby area R2, and the process proceeds to step S111.

In step S115, the processor 2 determines whether the vehicle C can turn right at the standby position set by the standby position setting unit 26 according to the road information, the current position of the vehicle C, and the detection result of the object detector 13. For example, the processor 2 determines whether the vehicle C can turn right by determining whether a straight-running vehicle in the opposite lane closest to the intersection reaches the intersection within the required time $Tb_x$ from the standby position of the vehicle C, according to the position of the straight-running vehicle in the opposite lane and the legal speed limit in the opposite lane. The process proceeds to step S116 when the vehicle C can turn right, and the process proceeds to step S117 when the vehicle cannot turn right.

In step S116, the processor 2 directs the vehicle C to start turning right, and the process returns to step S101. When the vehicle C is an autonomous vehicle, the processor 2 controls the vehicle controller 3 to operate the vehicle C to start turning right. When the vehicle C is a vehicle driven by the operation of the driver, the processor 2 directs the driver to start turning right by sound or an image through the output unit 5.

In step S117, the processor 2 keeps the vehicle C waiting at the standby position P1. Further, in step S117, when the blind spot estimation unit 22 determines that the blind spot estimated at the standby position P1 is worsened due to a standby vehicle and the like detected by the standby vehicle determination unit 21, the blind spot estimation unit 22 may notify the driver that the blind spot is worsened through the output unit 5, so as to urge the driver to ensure the field of view. When the vehicle C is an autonomous vehicle, the processor 2 may transfer the authority to operate to the driver.

Further, in step S117, when the object detector 13 serving as a following vehicle detector detects the following vehicle, the standby position setting unit 26 may execute correction to successively change the standby position P1 toward the middle of the intersection within the standby area R2 depending on the standby time elapsed. In addition, in step S117, the standby position setting unit 26 may execute correction to successively change the standby position P1 toward the middle of the intersection within the standby area R2 until a signal detected by the object detector 13 serving as a signal detector is changed.

The driving assistance device according to the first embodiment sets the standby area R2 while taking account of a blind spot of the object detector 13 caused in the opposite lane facing the vehicle C, so as to direct the vehicle C to wait to turn right or left at a position in view of a risk and efficiency of the right or left turn.

The driving assistance device according to the first embodiment sets the standby position P1 based on the time headway Ta between straight-running vehicles in the opposite lane and the required time Tb necessary for turning right or left, so as to direct the vehicle C to wait to turn right or left at a position determined while taking account of the volume of traffic in the opposite lane.

The driving assistance device according to the first embodiment calculates the required time Tb necessary for turning right or left depending on the scale of the intersection, so as to direct the vehicle C to wait to turn right or left at a position varying depending on the type of the intersection, such as multiple lanes.

The driving assistance device according to the first embodiment sets the standby position P1 such that the time headway Ta approximates to the required time Tb, so as to further improve the efficiency of the right turn while taking account of risk.

The driving assistance device according to the first embodiment estimates a blind spot based on the angular resolution of the object detector 13 and the position of a standby vehicle, so as to execute the estimation of the blind spot with high accuracy with respect to an actual blind spot.

The driving assistance device according to the first embodiment notifies the user that the estimated blind spot is worsened, so as to reduce the risk of starting the right turn with the increased blind spot.

The driving assistance device according to the first embodiment gradually changes the standby position P1 toward the middle of the intersection when the following vehicle is present, so as to reduce the discomfort of the following vehicle.

The driving assistance device according to the first embodiment gradually changes the standby position P1 toward the middle of the intersection when waiting for the change of indication of a traffic signal at the intersection, so as to turn right or left smoothly while expecting the subsequent action of an oncoming vehicle in the opposite lane upon the change of indication of the traffic signal.

[Second Embodiment]

Figure 8:
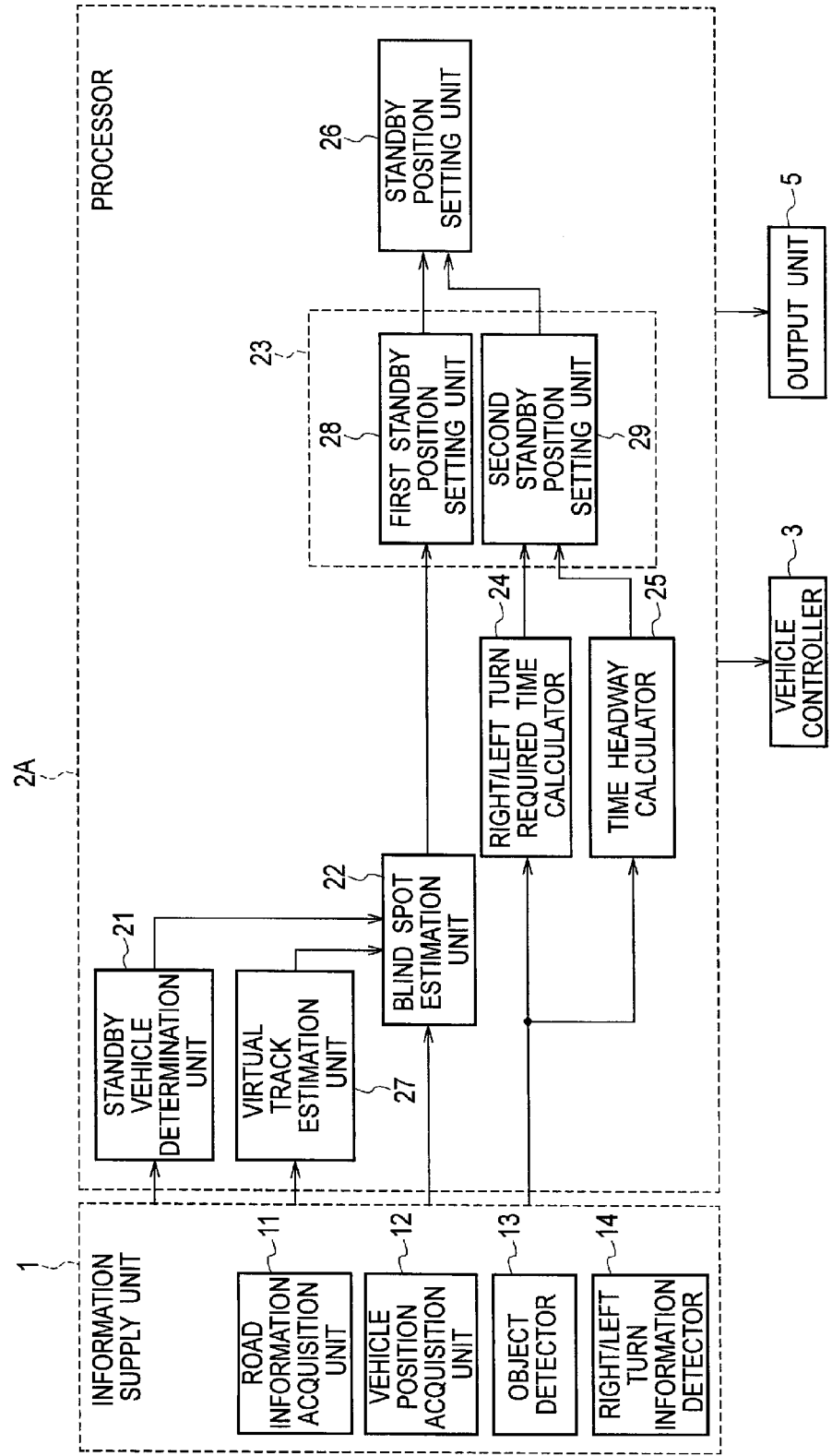
FIG. 8 is a block diagram for describing a fundamental configuration of a driving assistance device according to a second embodiment of the present invention.

A driving assistance device according to the second embodiment differs from that of the first embodiment in that a processor 2A further includes a virtual track estimation unit 27, a first standby position setting unit 28, and a second standby position setting unit 29, as shown in FIG. 8. The other elements in the second embodiment are substantially the same as those in the first embodiment, and overlapping explanations are not repeated below.

The virtual track estimation unit 27 estimates a virtual track on which an oncoming vehicle in the opposite lane turns right or left, depending on the scale of the intersection, for example, when the right/left turn information detector 14 detects the right/left turn information. The blind spot estimation unit 22 estimates a virtual blind spot of the object detector 13 caused in the opposite lane according to the virtual track estimated by the virtual track estimation unit 27 and the angular resolution of the object detector 13.

The first standby position setting unit 28 sets, within the standby allowable area R1, a first standby position in which the vehicle C can observe the opposite lane sufficiently, based on the virtual blind spot estimated by the blind spot estimation unit 22. The second standby position setting unit 29 sets, within the standby allowable area R1, a second standby position closer to the middle of the intersection than the first standby position set by the first standby position setting unit 28. The standby position setting unit 26 sets a standby position at which the vehicle C waits to turn right or left between the first standby position and the second standby position, according to the required time $Tb_x$ calculated by the right/left turn required time calculator 24 and the time headway Ta calculated by the time headway calculator 25.

<Driving Assistance Method>

Figure 9:
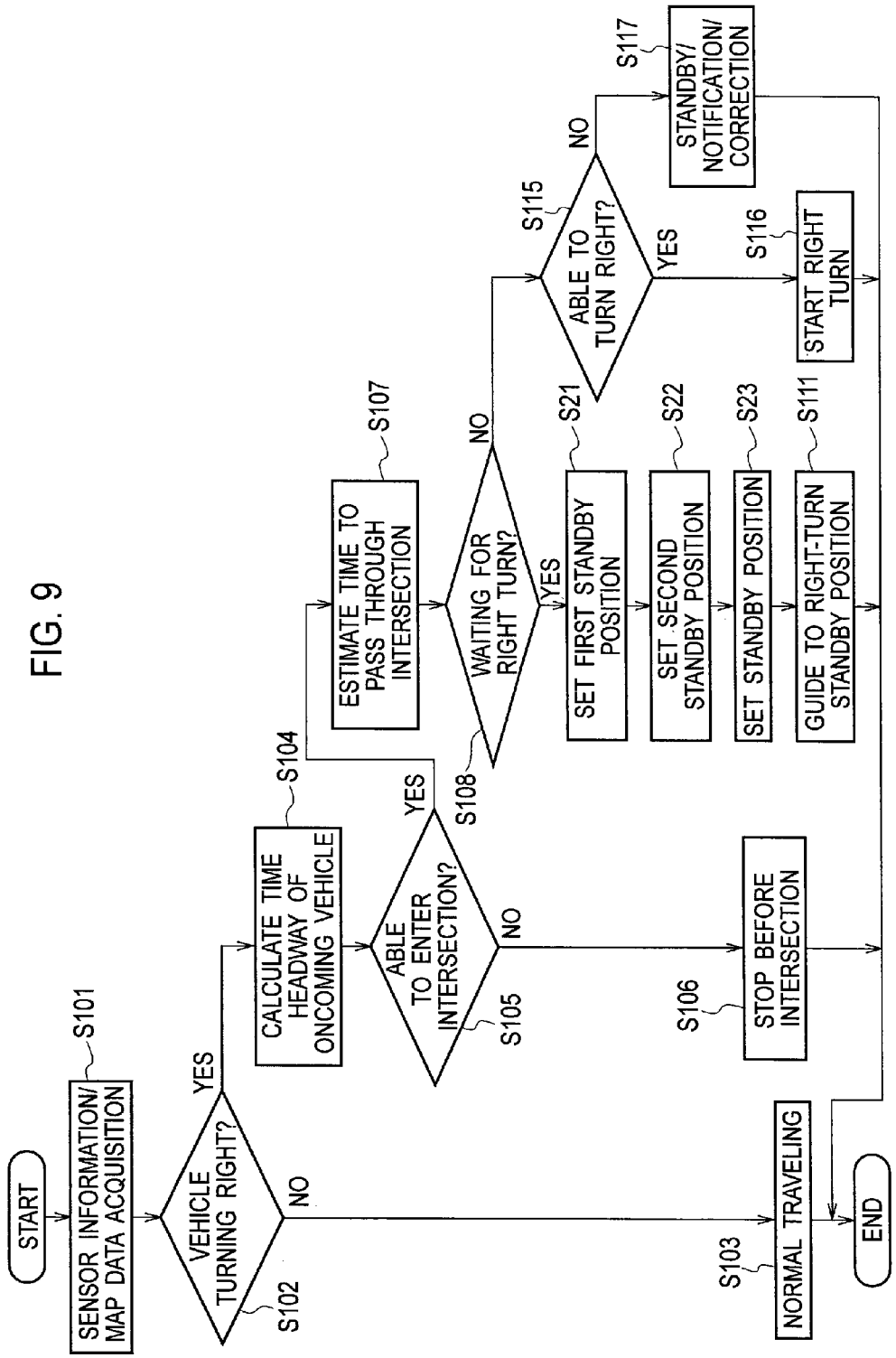
FIG. 9 is a flowchart for describing the operation of the driving assistance device according to the second embodiment of the present invention.

An example of a driving assistance method by the driving assistance device according to the second embodiment is described below with reference to the flowchart shown in FIG. 9. The processing operations in steps S101 to S108, S111, and S115 to S117 are substantially the same as those in the first embodiment, and overlapping explanations are not repeated below.

When it is determined in step S108 that the vehicle C is waiting to turn right at the standby position set by the standby position setting unit 26, the first standby position setting unit 28 sets the first standby position within the standby allowable area R1 in step S21.

Figure 10:
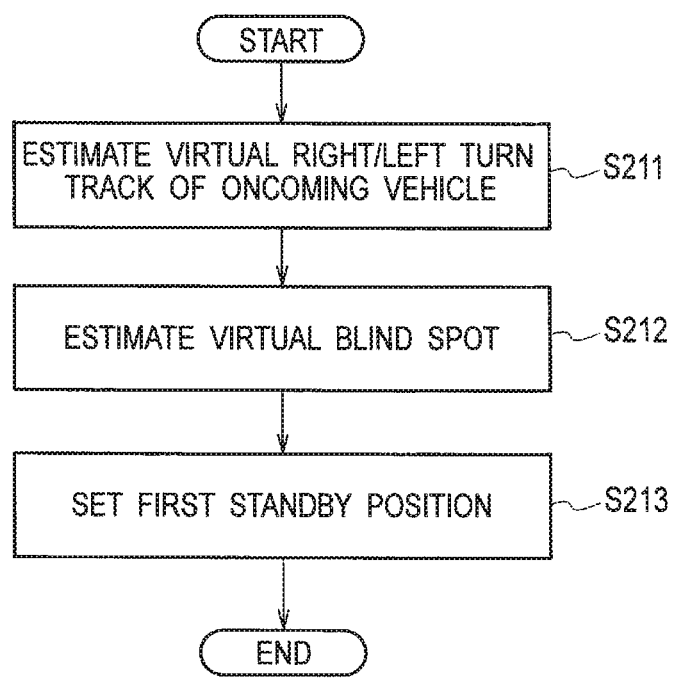
FIG. 10 is a flowchart for describing the process in step S21 in detail in the flowchart of FIG. 9.
Figure 11:
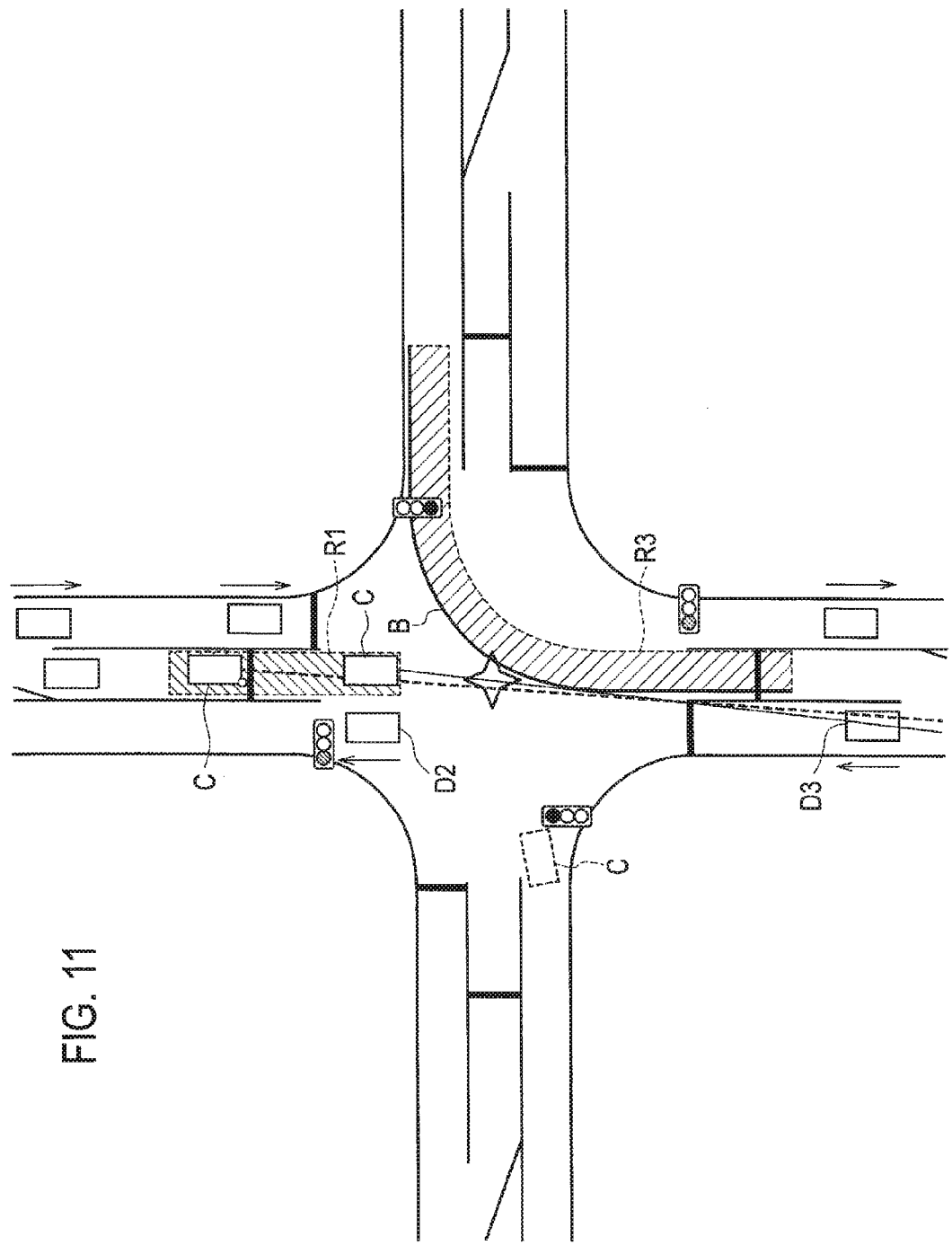
FIG. 11 is a view for describing the operation of the driving assistance device according to the second embodiment of the present invention.

The processing in step S21 is described in detail below with reference to the flowchart shown in FIG. 10. In step S211, the virtual track estimation unit 27 assumes that there is an oncoming vehicle turning right in the opposite lane, and estimates a virtual track B for the oncoming vehicle, as shown in FIG. 11. The virtual track estimation unit 27 estimates the virtual track by use of a model of Ackerman steering, for example.

The model of Ackerman steering is represented by the following equations (1) to (3). The equations (1) and (2) are differential equations for a path length z in the respective x and y directions. The equation (3) is a differential equation for the path length z in an attitude direction of the vehicle C. In the equations (1) to (3), δ represents a steering angle, Lw represents a wheelbase, and κ represents a turning curvature.

[Math. 1]
$$\frac{dx(z)}{dz} = \cos\theta(z) \quad (1)$$

[Math. 2]
$$\frac{dy(z)}{dz} = \sin\theta(z) \quad (2)$$

[Math. 3]
$$\frac{d\theta(z)}{dz} = \frac{\tan\delta}{L_w} = \kappa(z) \quad (3)$$

Figure 12:
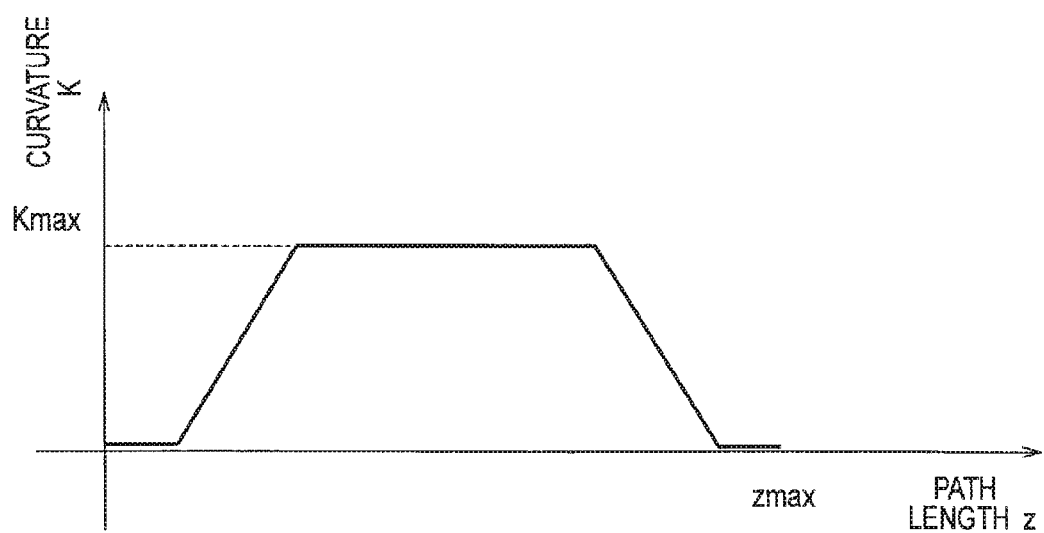
FIG. 12 is a view for describing a model of Ackerman steering.

For example, when the turning curvature κ as shown in FIG. 12 is a model input, the locus is defined by a clothoid segment at which κ increases monotonously, a curvature-constant segment at which κ is constant, and a clothoid segment at which κ decreases monotonously, wherein the steering angle finally returns to a neutral position. A path length zmax and a maximum turning curvature κmax are determined depending on the scale of the intersection. The integral value of κ indicated by a trapezoid denotes a final vehicle attitude and results in 90° when the intersection includes two orthogonal lanes, but may be determined depending on the intersecting angle of the intersection.

Since each coordinate of the locus represented by the equations (1) to (3) represents the central position of the axle of the rear wheels of a virtual vehicle, the virtual track estimation unit 27 offsets each coordinate by use of a predetermined virtual vehicle length Lx and a virtual vehicle width Ly, so as to calculate the track B at the front left edge or the rear left edge of the virtual vehicle. The track B is calculated by vector graphics of $[x_z, y_z]$ (z=0 to zmax). In the example shown in FIG. 11, the track B is a boundary on the left side in the region R3 indicating the track of the virtual vehicle turning right in the opposite lane.

In step S212, the blind spot estimation unit 22 estimates a virtual blind spot of the object detector 13 caused in the opposite lane at each position within the standby allowable area R1, based on the virtual track B estimated in step S211.

The blind spot estimation unit 22 estimates the blind spot at each position within the standby allowable area R1 in the x direction and the y direction (the right-left direction of the vehicle C) orthogonal to the x direction. For example, when the vehicle C is directed through the brake 32 or the output unit 5, the blind spot estimation unit 22 may estimate a blind spot at each position in the x direction while limiting to the position of the vehicle C in the y direction at the stop line. When the vehicle C is autonomously directed, the blind spot estimating unit 22 may estimate a blind spot at each position in the x direction while limiting to the position of the vehicle C in the y direction closer to the opposite lane in the traveling lane, so as to ensure better visibility. Even when the vehicle C is directed through the brake 32 or the output unit 5, the blind spot estimating unit 22 may estimate a blind spot at each position in the x direction while limiting to the position of the vehicle C in the y direction closer to the opposite lane in the traveling lane, so that the vehicle C is guided by the output unit 5 to the position in the traveling lane closer to the opposite lane. Each position in the x direction used for estimating the blind spot by the blind spot estimating unit 22 is each position used for calculating the required time $Tb_x$ in step S107.

For example, as shown in FIG. 11, the blind spot estimation unit 22 estimates the virtual blind spot of the object detector 13 caused in the virtual track B estimated by the virtual track estimation unit 27. The blind spot estimation unit 22 lays out the vehicle C and the virtual track B on the digital map. In the example shown in FIG. 11, the virtual blind spot is caused in the opposite lane on the right side of each connection line of the object detector 13 at each position within the standby allowable area R1 and the track B.

The blind spot estimation unit 22 may estimate a blind spot according to an observable field of view, and angular resolution and range resolution of the object detector 13. For example, when the object detector 13 for detecting objects on the front side is installed in the middle of the vehicle C in the vehicle width direction, the blind spot estimation unit 22 calculates a contact line in contact with the track B and passing through the coordinates of the object detector 13 within the standby allowable area R1 in the intersection. In particular, the coordinates of the object detector 13 within the standby allowable area R1 are defined as $[x_{r1}, y_{r1}] \in R1$, and discretized by predetermined resolution, so as to calculate an arctangent when each pair of $[x_{r1}, y_{r1}]$ is used as an initial point, and each pair of $[x_z, y_z]$ in the track B is used as a terminal point. The line connecting the terminal point and the initial point corresponding to inflection points of the calculated arctangent is the connection line.

In step S213, the first standby position setting unit 28 sets, within the standby allowable area R1, the first standby position in which the vehicle C can sufficiently to look out over the distance to the opposite lane while the vehicle C is waiting to turn right, based on the virtual blind spot estimated in step S212. The first standby position is a position that the object detector 13 can detect the distance to the opposite lane to be observed, for example. The first standby position setting unit 28 determines the distance to the opposite lane to be observed according to the legal speed limit in the opposite lane included in the road information. When the processing in step S213 is finished, the processing in step S21 is completed, and the process proceeds to step S22.

In step S22, the second standby position setting unit 29 sets, within the standby allowable area R1, the second standby position closer to the middle of the intersection than the first standby position set in step S21. The second standby position setting unit 29 sets the second standby position based on, for example, the first standby position, the turning curvature of the vehicle C, and the limitation of the rate in change of the curvature. Alternatively, a virtual standby position within the standby allowable area R1 at which the required time $Tb_x$ approximates to the time headway Ta, may be set as the second standby position.

In step S23, the standby position setting unit 26 sets the standby position P1 at which the vehicle C waits to turn right between the first standby position and the second standby position set in step S21 and step S22, respectively, and the process proceeds to step S111.

The series of processing operations from step S21 to step S23 may be executed when the object detector 13 does not detect a standby vehicle waiting to turn right in the opposite lane. The series of processing operations from step S21 to step S23 may be executed, as another routine, in parallel to the series of processing operations from step S109 to step S114 in the flowchart shown in FIG. 3, regardless of the presence or absence of a standby vehicle.

The standby position setting unit 26 sets the standby position P1 closer to the first standby position at which better visibility may fundamentally be ensured more reliably. The standby position P1 may be set closer to the second standby position when there is no standby vehicle waiting to turn right in the opposite lane but there is a distance between straight-running vehicles in the opposite lane available for turning right.

In step S117, the standby position setting unit 26 may execute correction to successively change the standby position P1 toward the second standby position after a predetermined time has passed since the vehicle C has reached the standby position P1. The standby position setting unit 26 may successively change the standby position P1 toward the second standby position when no vehicle turning right in the opposite lane is detected within a predetermined period of time after the vehicle C has reached the standby position P1.

Further, in step S117, the standby position setting unit 26 may execute correction to successively change the standby position P1 toward the second standby position depending on the standby time elapsed when the object detector 13 serving as a following vehicle detector detects the following vehicle. In addition, in step S117, the standby position setting unit 26 may execute correction to successively change the standby position P1 toward the second standby position until a signal detected by the object detector 13 serving as a signal detector is changed.

The driving assistance device according to the second embodiment estimates the virtual blind spot caused in the opposite lane facing the vehicle C, so as to direct the vehicle C to wait to turn right or left at a position in view of a subsequent change of traffic conditions.

The driving assistance device according to the second embodiment estimates the virtual blind spot depending on the scale of the intersection, so as to further improve the efficiency of the right turn while taking account of risk.

The driving assistance device according to the second embodiment sets the standby position P1 based on the time headway Ta between straight-running vehicles in the opposite lane and the required time Tb necessary for turning right or left, so as to direct the vehicle C to wait to turn right or left at a position determined while taking account of the volume of traffic in the opposite lane.

The driving assistance device according to the second embodiment calculates the required time Tb necessary for turning right or left depending on the scale of the intersection, so as to direct the vehicle C to wait to turn right or left at a position varying depending on the type of the intersection, such as multiple lanes.

The driving assistance device according to the second embodiment notifies the user that the estimated blind spot is worsened, so as to reduce the risk of starting the right turn with the increased blind spot.

The driving assistance device according to the second embodiment changes the standby position P1 toward the second standby position for an easier right turn depending on the standby time at the standby position P1, so as to reduce the discomfort of the passenger during the standby in front of the intersection.

The driving assistance device according to the second embodiment changes the standby position P1 toward the second standby position depending on the standby time at the standby position P1 when there is no vehicle turning right or left in the opposite lane, so as to increase the chance to turn right or left appropriately.

The driving assistance device according to the second embodiment gradually changes the standby position P1 toward the middle of the intersection when the following vehicle is present, so as to reduce the discomfort of the following vehicle.

The driving assistance device according to the second embodiment gradually changes the standby position P1 toward the middle of the intersection when waiting for the change of indication of a traffic signal at the intersection, so as to turn right or left smoothly while expecting the subsequent action of an oncoming vehicle in the opposite lane upon the change of indication of the traffic signal.

[Other Embodiments]

While the present invention has been described above with reference to the embodiments, it should be understood that the present invention is not intended to be limited to the descriptions and the drawings composing part of this disclosure. Various alternative embodiments, examples, and technical applications will be apparent to those skilled in the art according to this disclosure. It should also be understood that the present invention includes various kinds of embodiments not described herein. Therefore, the scope of the present invention is defined only by the appropriate features according to the claims in view of the explanations made above.

The present invention can provide a driving assistance device and a driving assistance method capable of directing the vehicle C to wait to turn right or left at a position in view of a risk and efficiency of the right or left turn while taking account of a blind spot caused in the opposite lane facing the vehicle C.

REFERENCE SIGNS LIST

11 ROAD INFORMATION ACQUISITION UNIT
12 VEHICLE POSITION ACQUISITION UNIT
13 OBJECT DETECTOR
14 RIGHT/LEFT TURN INFORMATION DETECTOR
21 STANDBY VEHICLE DETERMINATION UNIT
22 BLIND SPOT ESTIMATION UNIT
23 STANDBY AREA SETTING UNIT
24 RIGHT/LEFT TURN REQUIRED TIME CALCULATOR
25 TIME HEADWAY CALCULATOR
26 STANDBY POSITION SETTING UNIT
27 VIRTUAL TRACK ESTIMATION UNIT

The invention claimed is:

1. A driving assistance device comprising:
a navigation device configured to acquire road information so that a vehicle can follow a road to drive;
a sensor configured to acquire a current position of the vehicle included in the road information;
an object detector configured to detect an object in front of the vehicle;
a right/left turn information detector configured to detect right/left turn information indicating that the vehicle passes across an opposite lane to turn right or left at an intersection after a predetermined period of time;
a standby vehicle determination processor configured to determine whether a standby vehicle waiting to turn right or left in the opposite lane is present in the intersection according to the road information, the current position, and a detection result of the object detector when the right/left turn information detector detects the right/left turn information;
a blind spot estimation processor configured to estimate a blind spot of the object detector caused in the opposite lane due to the standby vehicle; and
a standby area setting processor configured to set a standby area in which the object detector can detect the opposite lane while the vehicle waits to turn right or left, based on the blind spot estimated by the blind spot estimation processor.

2. The driving assistance device according to claim 1, further comprising:
a right/left turn required time calculator configured to calculate each required time during which the vehicle starts and finishes turning right or left;
a time headway calculator configured to calculate a time headway between straight-running vehicles in the opposite lane until the vehicle enters the intersection according to the road information, the current position, and the detection result of the object detector; and
a standby position setting processor configured to set a standby position at which the vehicle waits to turn right or left within the standby area according to the required time and the time headway.

3. The driving assistance device according to claim 2, wherein the right/left turn required time calculator calculates, as the required time, a period of time during which the vehicle moves from the standby position to a position not inhibiting an object from passing through the intersection, depending on a scale of the intersection.

4. The driving assistance device according to claim 2, wherein the standby position setting processor sets the standby position such that the time headway approximates to the required time.

5. The driving assistance device according to claim 1, wherein the blind spot estimation processor estimates the blind spot according to angular resolution of the object detector and a position of the standby vehicle.

6. The driving assistance device according to claim 2, wherein the blind spot estimation processor notifies a user that the estimated blind spot is worsened while the vehicle waits to turn right or left at the standby position set by the standby position setting processor.

7. The driving assistance device according to claim 2, further comprising a following vehicle detector configured to detect a following vehicle following the vehicle,
wherein the standby position setting processor changes the standby position toward a middle of the intersection when the following vehicle detector detects the following vehicle while the vehicle waits to turn right or left at the standby position.

8. The driving assistance device according to claim 2, further comprising a signal detector configured to detect a signal indicated by a traffic signal at the intersection,
wherein the standby position setting processor changes the standby position toward a middle of the intersection until the signal detected by the signal detector is changed while the vehicle waits to turn right or left at the standby position.

9. The driving assistance device according to claim 1, further comprising a virtual track estimation processor configured to estimate a virtual track on which an oncoming vehicle in the opposite lane turns right or left when the right/left turn information detector detects the right/left turn information,
wherein the blind spot estimation processor estimates a virtual blind spot of the object detector in the opposite lane based on the virtual track.

10. The driving assistance device according to claim 9, wherein the virtual track estimation processor estimates the virtual track depending on a scale of the intersection.

11. The driving assistance device according to claim 9, further comprising:
a right/left turn required time calculator configured to calculate each required time during which the vehicle starts and finishes turning right or left;
a time headway calculator configured to calculate a time headway between straight-running vehicles in the opposite lane until the vehicle enters the intersection according to the road information, the current position, and the detection result of the object detector; and
a standby position setting processor configured to set a standby position at which the vehicle waits to turn right or left between a first standby position set according to the virtual blind spot and a second standby position set closer to a middle of the intersection than the first standby position, according to the required time and the time headway.

12. The driving assistance device according to claim 11, wherein the right/left turn required time calculator calculates, as the required time, a period of time during which the vehicle moves from the standby position to a position not inhibiting an object from passing through the intersection, depending on the scale of the intersection.

13. The driving assistance device according to claim 11, wherein the blind spot estimation processor notifies a user that the estimated blind spot is worse than the virtual blind spot while the vehicle waits to turn right or left at the standby position set by the standby position setting processor.

14. The driving assistance device according to claim 11, wherein the standby position setting processor changes the standby position toward the second standby position after a predetermined time has passed since the vehicle has reached the standby position while the vehicle waits to turn right or left at the standby position set by the standby position setting processor.

15. The driving assistance device according to claim 11, wherein the standby position setting processor changes the standby position toward the second standby position when the object detector does not detect an oncoming vehicle turning right or left in the opposite lane within a predetermined period of time after the vehicle has reached the standby position while the vehicle waits to turn right or left at the standby position set by the standby position setting processor.

16. The driving assistance device according to claim 11, further comprising a following vehicle detector configured to detect a following vehicle following the vehicle,
wherein the standby position setting processor changes the standby position toward the second standby position when the following vehicle detector detects the following vehicle while the vehicle waits to turn right or left at the standby position.

17. The driving assistance device according to claim 11, further comprising a signal detector configured to detect a signal indicated by a traffic signal at the intersection,
wherein the standby position setting processor changes the standby position toward the second standby position until the signal detected by the signal detector is changed while the vehicle waits to turn right or left at the standby position.

18. A driving assistance method comprising:
acquiring road information so that a vehicle can follow a road to drive;
acquiring a current position of the vehicle included in the road information;
detecting an object in front of the vehicle by an object detector;
detecting right/left turn information indicating that the vehicle passes across an opposite lane to turn right or left at an intersection after a predetermined period of time;
determining whether a standby vehicle waiting to turn right or left in the opposite lane is present in the intersection according to the road information, the current position, and a detection result of the object detector when the right/left turn information is detected;
estimating a blind spot of the object detector caused in the opposite lane due to the standby vehicle; and
setting a standby area in which the object detector can detect the opposite lane while the vehicle waits to turn right or left according to the blind spot.

* * * * *